(12) United States Patent
Schröder et al.

(10) Patent No.: US 8,528,858 B2
(45) Date of Patent: Sep. 10, 2013

(54) REDUCING CIRCULATION IN A WAKE TURBULENCE BEHIND AN AIRPLANE FLYING AT LOW ALTITUDE

(75) Inventors: Andreas Schröder, Göttingen (DE); Robert Konrath, Göttingen (DE)

(73) Assignee: Deutsches Zentrum fur Luft-und Raumfahrt E.V., Cologne (DE)

( * ) Notice: Subject to any disclaimer, the term of this patent is extended or adjusted under 35 U.S.C. 154(b) by 153 days.

(21) Appl. No.: 13/094,147

(22) Filed: Apr. 26, 2011

(65) Prior Publication Data
US 2011/0210202 A1 Sep. 1, 2011

Related U.S. Application Data

(63) Continuation of application No. PCT/EP2009/064091, filed on Oct. 26, 2009.

(30) Foreign Application Priority Data

Oct. 31, 2008 (DE) .......................... 10 2008 054 107

(51) Int. Cl.
*B64F 1/36* (2006.01)
(52) U.S. Cl.
USPC .................................................. 244/114 R

(58) Field of Classification Search
USPC ...................................... 244/114 R; 114/261
See application file for complete search history.

(56) References Cited

U.S. PATENT DOCUMENTS

| | | | |
|---|---|---|---|
| 6,424,408 B1 * | 7/2002 | Ooga | 356/28.5 |
| 2007/0029442 A1 * | 2/2007 | Wolter | 244/114 R |
| 2010/0294890 A1 * | 11/2010 | Journade | 244/199.1 |
| 2012/0175466 A1 * | 7/2012 | Gregory et al. | 244/158.7 |

FOREIGN PATENT DOCUMENTS

DE 10 2005 025 004 A1 7/2006

OTHER PUBLICATIONS

International Preliminary Report on Patentability in co-pending, related PCT application No. PCT/EP2009/064091, mailed May 3, 2011.

* cited by examiner

*Primary Examiner* — Benjamin P Lee
(74) *Attorney, Agent, or Firm* — Thomas|Horstemeyer, LLP

(57) ABSTRACT

For reducing a circulation of wake vortexes in a wake turbulence behind an airplane flying over ground at low altitude, at least one ring vortex of airflow is generated at the ground on each side of a vertical middle plane of the airplane. Each ring vortex has a vortex axis and a direction of propagation, wherein the vortex axis is oriented at an angle with regard to the ground, and wherein the propagation direction is oriented upwards from the ground; and each ring vortex disturbs at least one wake vortex to induce its decay.

25 Claims, 3 Drawing Sheets

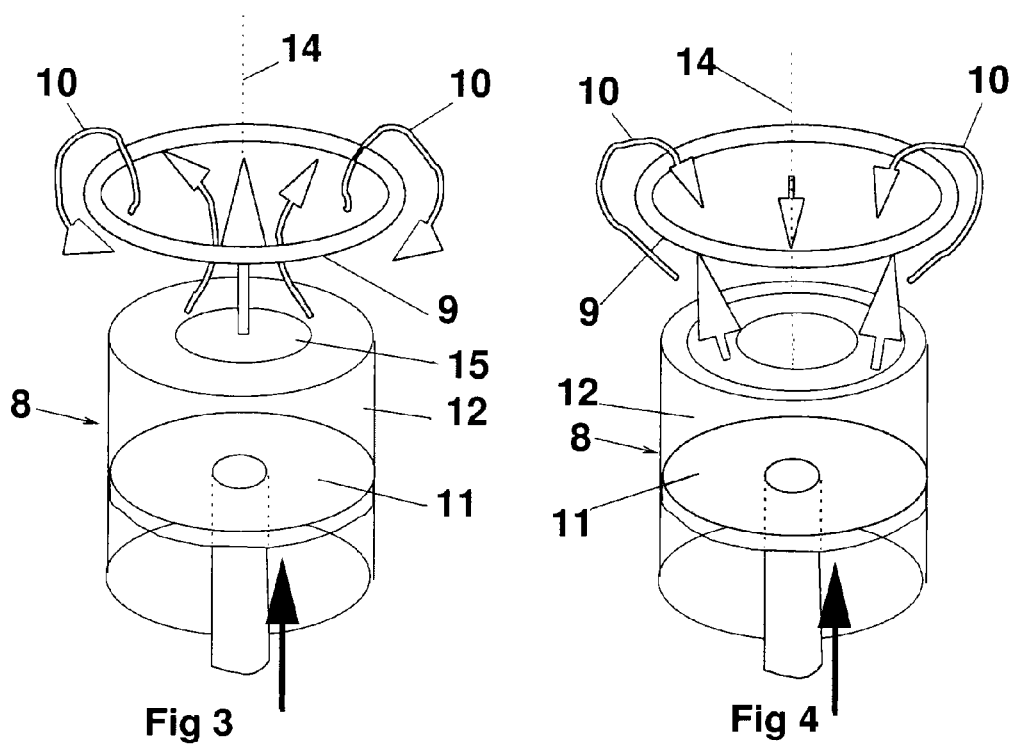

REDUCING CIRCULATION IN A WAKE TURBULENCE BEHIND AN AIRPLANE FLYING AT LOW ALTITUDE

CROSS REFERENCE TO RELATED APPLICATIONS

The present application is a continuation of International Application PCT/EP2009/064091 entitled "Verfahren und Vorrichtung zum Abmindern der Zirkulation in der Wirbelschleppe hinter einem startenden oder landenden Flugzeug", filed Oct. 26, 2009, and claims priority to co-pending German Patent Application No. DE 10 2008 054 107.9 also entitled "Verfahren und Vorrichtung zum Abmindern der Zirkulation in der Wirbelschleppe hinter einem startenden oder landenden Flugzeug", filed Oct. 31, 2008.

FIELD OF THE INVENTION

The invention relates to a method of reducing a circulation of wake vortexes in a wake turbulence behind an airplane flying over ground at low altitude, particularly behind an airplane that takes off or lands. Further, the invention relates to a device for reducing the circulation of wake vortexes in the wake turbulence behind an airplane flying along a runway at low altitude over ground.

BACKGROUND OF THE INVENTION

The active and reliable reduction of the circulation in the wake turbulences behind big commercial airplanes directly at a runway from which the airplane takes off or on which the airplane lands is of high interest to the operating companies and customers of airports as it allows for reducing the security-related minimum distance between two succeeding airplanes. Such a reduction means a more effective use of the runway and a time saving in airplane service. With continuously increasing air traffic and with a lot of airports already being close to their capacity limit, a local solution of the wake turbulence problem which increases with the weight and thus with the possible number of passengers of a commercial airplane would be an essential step in minimizing the dangers and cost of airport operation.

A method and a device for reducing the circulation of wake vortexes in the wake turbulence behind an airplane that takes off or lands are known from DE 10 2005 025 004 A1. Here, at the end of the respective runway, which is flown over by the airplane, air is sucked into the ground in two areas which are located opposing to each other across a vertical middle plane of the runway and which are at a distance to this runway middle plane, and the air is blown back out of the ground in two other areas, which are closer to the vertical middle plane of the runway. In this way, circulating airflows are generated on both sides of the vertical middle plane of the runway, whose circulation directions—on each side of the vertical middle plane of the runway—are opposite to the circulation directions of the wake vortexes of an airplane taking off from the runway or landing on the runway. As a result, the circumferential velocity at the outer circumference of the wake vortexes behind the airplane is changed, and spiral-shaped instabilities are induced in the wake vortexes. These spiral-shaped instabilities propagate along the core of the wake vortexes at a propagation velocity which is about 20% of the airplane velocity.

The known method and the known device are only working, if substantial amounts of air are sucked into the ground and blown back out of the ground, as only then a change in the circumferential velocity of the wake vortexes behind the airplane is caused, which is essential for inducing the desired spiral-shaped instabilities. Actually, a major part of the circulation of the wake vortexes has to be deviated. I.e. the airflow generated at the ground has to correspond to more than 50% of the circulation of the wing vortexes to be disturbed. As a result, ventilators of very high power are required to create the airflow disturbing the wake vortexes at the ground.

There is still a need of a method and a device which allow for actively and reliably disturbing wake turbulences behind big commercial airplanes at low effort.

SUMMARY OF THE INVENTION

In one aspect, the present invention provides a method of reducing a circulation of wake vortexes in a wake turbulence behind an airplane flying over ground at low altitude. This method comprises generating at least one ring vortex of airflow at the ground on each side of a vertical middle plane of the airplane. Each generated ring vortex has a vortex axis and a direction of propagation, wherein the vortex axis is oriented at an angle with regard to the ground, and wherein the propagation direction is oriented upwards from the ground; and each generated ring vortex disturbs at least one wake vortex to induce its decay.

In a more detailed aspect, the present invention provides a method of reducing a circulation of wake vortexes in a wake turbulence behind an airplane flying over ground at low altitude. This method comprises generating at least one ring vortex comprising an ascending airflow in its center at the ground on each side of a vertical middle plane of the airplane. Each generated ring vortex ascends from the ground for disturbing at least one wake vortex to induce its decay. The ring vortexes are generated at the ground below vortex axes of the wake vortexes to be disturbed at a circulation of 10 to 30% of the circulation of the wake vortexes to be disturbed and at such a time that they interact with the wake vortexes to be disturbed at a distance to the airplane of 25 to 30 wing spans of the airplane. In a further aspect, the present invention provides a device for reducing the circulation of wake vortexes in the wake turbulence behind an airplane flying along a runway at low altitude over ground. This device comprises at least one ring vortex generator arranged at the ground on each side of the runway. The ring vortex generators are designed and oriented to the ground to generate ring vortexes of airflow having a vortex axis oriented at an angle with regard to the ground and a direction of propagation oriented upwards from the ground.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention will be better understood with reference to the following drawings. The components in the drawings are not necessarily to scale, emphasis instead being placed upon clearly illustrating the principles of the present invention.

FIG. 3 illustrates the construction of a possible embodiment of a vortex generator according to FIG. 2; and FIG. 4 illustrates the construction of another possible embodiment of a vortex generator.

DETAILED DESCRIPTION

Figure 1:
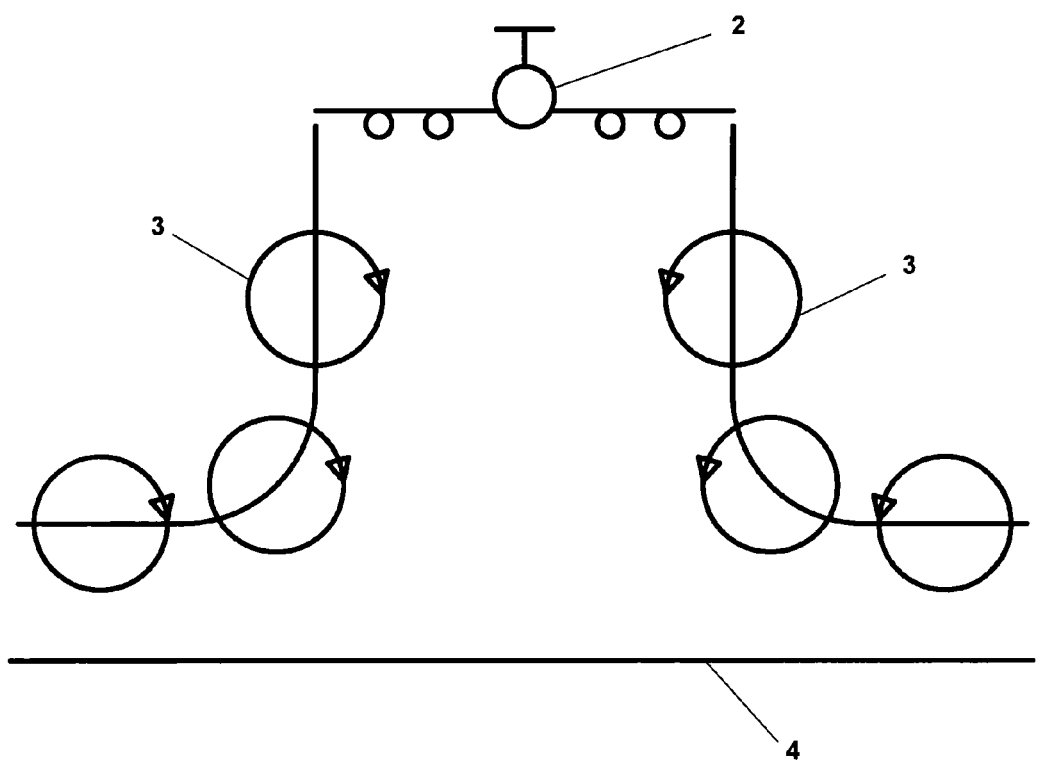
FIG. 1 shows the propagation of a wake turbulence behind an airplane that takes off or lands.

In the present invention, ring vortexes whose vortex axes are oriented at an angle with regard to the ground and which ascend from the ground are generated as airflows disturbing the wake vortexes. If this is done in such a way that the ring vortexes move towards the individual wake vortexes and interact with them, which is easily realized, there is a quick decay of the wake vortexes due to a strong excitation of disturbances and due to a resulting turbulent dissipation. For this purpose, comparative low circulations of the ring vortexes are sufficient. The local disturbance of the wake vortexes caused by the ring vortexes propagates at about 20% of the velocity of the airplane along the axis of the wake vortexes and destroys the wake turbulence at the same velocity in both directions, i.e. towards to and away from the flying airplane. With a landing velocity of the airplane of 300 km/h, for example, the destruction of the wake turbulence propagates at 60 km/h in positive and negative direction of the vortex axis, and 30 seconds after the first disturbing interaction the wake turbulence is already destroyed over a length of 1 km.

The ascending ring vortexes may be generated with an ascending or descending airflow in their center.

Preferably, the angle at which the vortex axes of the ring vortexes are oriented with regard to the ground is an obtuse angle, i.e. an angle in the range from 45° to 135°, particularly in the range from 60° to 130°, more particularly it may be close to 90°. Preferably, the vortex axes of the ring vortexes are about orthogonal with regard to the axes of the wake vortexes to be disturbed. Often, the ascending propagation directions of the ring vortexes will extend along their vortex axes, or at a small angle between the propagation directions of the ring vortexes and their vortex axes.

The circulation of the generated ring vortexes is typically in a range from 5 to 50% of the circulation of the wake vortexes to be disturbed. Preferably, it is in a range from 10 to 30% of this circulation. Particularly, the circulation of the generated ring vortexes may be less than a quarter of the circulation of the wake vortexes to be disturbed, and thus comparatively small.

In the new method, at least one pair of ring vortexes exciting disturbance is generated per vortex pair to be disturbed. Several pairs of ring vortexes may be generated at the same or different places at the same time or consecutively. The individual pairs of ring vortexes should be generated in such a way that they add up with regard to the excitation of disturbances as constructive as possible.

The optimum place of generating the ring vortexes is below the axes of the wake vortexes to be disturbed. However, the position of the axes of the wake vortexes to be disturbed at the point in time of their creation is not decisive but the position of the axes of the wake vortexes to be disturbed at the point in time of the disturbing interaction of the ring vortexes with the wake vortexes. Thus, use can be made of the fact that the essential wake vortexes descend behind an airplane and move laterally away from the airplane due to their interaction with the ground. However, it is of interest to disturb the wake vortexes as early as possible, i.e. prior to a strong propagation of the wake turbulence in lateral direction.

Actually, the ring vortexes may be generated in an area at the ground which is flown over by the airplane at low altitude.

A wake turbulence behind an airplane that takes off or lands typically consists of several vortex pairs, particularly of the wing tip vortexes and the flap vortexes. As the vortexes of these vortex pairs having the same orientation typically merge at a distance of between 4 to 8 wing spans behind the airplane and as an increased sensitivity of the wake turbulence with regard to disturbances is reached after about 25 to 30 wing spans, the desired disturbances are particularly effectively excited by means of the ring vortexes according to the invention at a distance of 20 to 50 wing spans, preferably of 25 to 30 wing spans behind the flying airplane. Particularly, an effectively disturbing interaction is possible here by ring vortexes of comparatively low circulation. Further, the wake turbulence has not yet propagated very far. However, a very early interaction of the ring vortexes with the wake vortexes within 4 to 8 wing spans behind the flying airplane may also be considered.

Ring vortex generators for generating ring vortexes are generally known. Such known ring vortex generators (RVG) are able to produce stable and reproducible ring vortexes of high circulation in an efficient way, which have a defined propagation direction and a defined propagation velocity as well as a defined vortex diameter and a defined ring diameter. The basic principle of such ring vortex generators is simple and will be exemplarily explained in the following.

Referring now in greater detail to the drawings, FIG. 1 illustrates a wake turbulence 1 behind an airplane that takes off or lands, only the wing tip vortexes 3 of the total wake vortexes being considered here. In the same way as all other wake vortexes, the wing tip vortexes 3 occur as a pair of opposite circulation. They descend behind the airplane 2 towards the ground 4. FIG. 1 illustrates the position of the wing tip vortexes 1, 2 and 3 minutes after their creation at the airplane 2. As soon as the wing tip vortexes 3 get close to the ground 4, they move laterally away from a vertical middle plane of the airplane due to their interaction with the ground 4 so that the wake turbulence not only has a high vertical but also a high horizontal extension behind the airplane 2 over which it endangers subsequent airplanes until the wing vortexes decay. This decay takes some minutes with heavy weight airplanes 2 and corresponding strong circulation of the wing tip vortexes 3. The present invention aims to considerably reduce this period in time.

Figure 2:
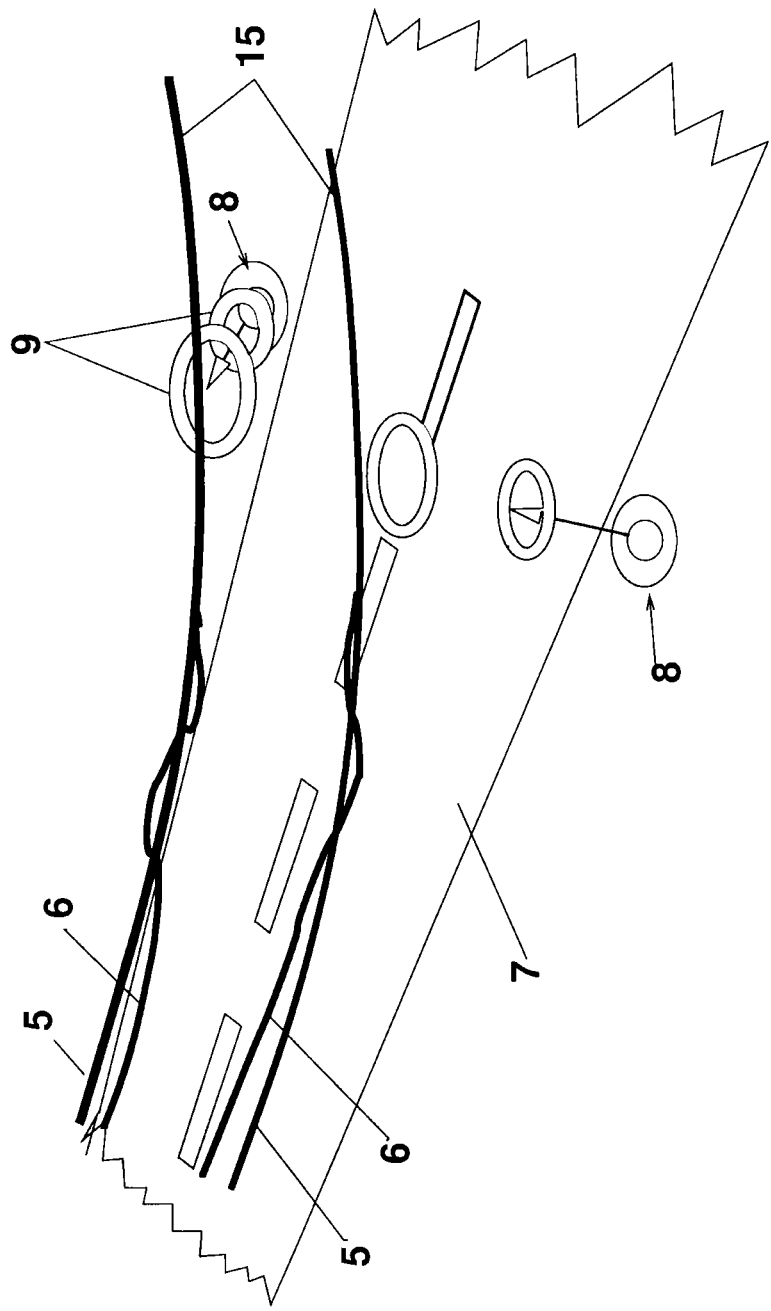
FIG. 2 shows an embodiment of the present invention having four vortex generators embedded in a runway for disturbing the wing tip vortexes and the flap vortexes behind a landing airplane.

FIG. 2 illustrates the course of vortex axes 5 of the wing tip vortexes and of vortex axes 6 of the flap vortexes behind an airplane which lands on a runway 7 but which itself is not depicted here. The wing tip vortexes and the flap vortexes merge by adding up their circulation within 4 to 8 wing spans behind the flying airplane. Below the vortex axes 15 of these merged wake vortexes vortex generators 8 are provided next to the runway 7 to create ascending ring vortexes whose vortex axes are oriented essentially vertically with regard to the surface of the runway 7 whereas they ascend above the runway at an angle smaller than 90° with regard to the runway 7 into the area of the vortex axes 15. These ring vortexes 9 interact with the wake vortexes in that they induce a disturbance resulting in a decay of the respective wake vortex which propagates from the place of the immediate interaction in both directions along the vortex axes 15. It is depicted in FIG. 2 that each vortex generator 8 ejects two ring vortexes 9. At least one ring vortex 9 is needed per each wake vortex to be disturbed.

FIG. 3 illustrates a possible embodiment of a vortex generator 8 for creating a ring vortex 9 having an airflow 10 ascending in its center. A piston 11 is moved upwards within a pressure chamber 12 and presses air out of the cylindrical pressure chamber 12 through a central circular-shaped opening 15 having a reduced diameter as compared to the pressure chamber. The resulting ring vortex 9 ascends in the direction of its vortex axes 14.

FIG. 4 sketches a possible embodiment of a vortex generator 8 for creating a ring vortex 9 having an airflow 10 descending in its center. Here, the air is pressed out of a cylindrical pressure chamber 12 by a piston 11 through a ring slot 13 to atmosphere. Despite a different direction of vortex rotation, the resulting ring vortex 9 also ascends with a propagation direction along its vortex axis 14.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A method of reducing a circulation of wake vortices in a wake turbulence behind an airplane flying over ground at low altitude, the method comprising
at the ground on each side of a vertical middle plane of the airplane, generating at least one ring vortex of airflow, each ring vortex having a vortex axis and a direction of propagation, wherein the vortex axis is oriented at an angle with regard to the ground, and wherein the propagation direction is oriented upwards from the ground, and each ring vortex disturbing at least one wake vortex to induce its decay,
wherein the propagation direction of each ring vortex extends along its vortex axis.

2. The method of claim 1, wherein the airplane is taking off.

3. The method of claim 1, wherein the airplane is landing.

4. The method of claim 1, wherein the ring vortices are generated with an ascending airflow in their center.

5. The method of claim 1, wherein the ring vortices are generated with an descending airflow in their center.

6. The method of claim 1, wherein the ring vortices are generated at a circulation in a range from 5 to 50% of the circulation of the wake vortices to be disturbed.

7. The method of claim 6, wherein the ring vortices are generated at a circulation in a range from 10 to 30% of the circulation of the wake vortices to be disturbed.

8. The method of claim 1, wherein at least one pair of ring vortices is generated per pair of wake vortices of opposite rotation direction in the wake turbulence.

9. The method of claim 8, wherein the ring vortices are generated at the ground below vortex axes of the wake vortices to be disturbed.

10. The method of claim 1, wherein the ring vortices are generated in an area which is flown over by the airplane at low altitude.

11. The method of claim 1, wherein the ring vortices are generated behind the flying airplane at such a time that they interact with the wake vortices to be disturbed at a distance to the airplane of 20 to 50 wing spans of the airplane.

12. The method of claim 11, wherein the ring vortices are generated behind the airplane in such a way that they interact with the wake vortices to be disturbed at a distance to the airplane of 25 to 30 wing spans of the airplane.

13. The method of claim 1, wherein the angle at which the vortex axes are oriented with regard to the ground is in a range from 45° to 135°.

14. A method of reducing a circulation of wake vortices in a wake turbulence behind an airplane flying over ground at low altitude, the method comprising
at the ground on each side of a vertical middle plane of the airplane, generating at least one ring vortex of airflow, each ring vortex having a vortex axis and a direction of propagation, wherein the vortex axis is oriented at an angle with regard to the ground, and wherein the propagation direction is oriented upwards from the ground, and each ring vortex disturbing at least one wake vortex to induce its decay,
wherein the angle at which the vortex axes are oriented with regard to the ground is in a range from 45° to 135°.

15. The method of claim 14, wherein the angle at which the vortex axes are oriented with regard to the ground is in a range from 60° to 120°.

16. The method of claim 14, wherein the ring vortices are generated at the ground below vortex axes of the wake vortices to be disturbed at a circulation of 10 to 30% of the circulation of the wake vortices to be disturbed and at such a time that they interact with the wake vortices to be disturbed at a distance to the airplane of 25 to 30 wing spans of the airplane.

17. The method of claim 14, wherein the airplane is in a flight situation selected from taking off and landing.

18. A device for reducing the circulation of wake vortices in the wake turbulence behind an airplane flying along a runway at low altitude over ground, the device comprising
at least one ring vortex generator arranged at the ground on each side of the runway, the ring vortex generators being designed and oriented to the ground to generate ring vortices of airflow having a vortex axis oriented at an angle with regard to the ground and a direction of propagation oriented upwards from the ground,
wherein the ring vortex generators are oriented to the ground to generate the ring vortices with their vortex axes being oriented at an angle in a range from 45° to 135° with regard to the ground.

19. The device of claim 18, wherein the ring vortex generators are designed to generate the ring vortices with an airflow ascending in their center.

20. The device of claim 18, wherein the ring vortex generators are oriented to the ground to generate the ring vortices with their vortex axes being oriented at an angle in a range from 60° to 120° with regard to the ground.

21. The device of claim 18, wherein the ring vortex generators are dimensioned in such a way that they generate the ring vortices at a circulation in a range of 5 to 50% of a circulation of a main wake vortex in a wake turbulence behind a maximum weight commercial airplane.

22. The device of claim 21, wherein the ring vortex generators are dimensioned in such a way that they generate the ring vortices at a circulation in a range of 10 to 30% of a circulation of a main wake vortex in a wake turbulence behind a maximum weight commercial airplane.

23. The device of claim 18, wherein the ring vortex generators are embedded in the runway.

24. The device of claim 18, wherein the ring vortex generators are arranged next to the runway.

25. The device of claim 18, wherein the ring vortex generators are arranged in an area of the runway which is flown over by the airplane at low altitude.

* * * * *